US011567999B2

(12) United States Patent
Subramani et al.

(10) Patent No.: US 11,567,999 B2
(45) Date of Patent: *Jan. 31, 2023

(54) USING A B-TREE TO STORE GRAPH INFORMATION IN A DATABASE

(71) Applicant: TIBCO Software Inc., Palo Alto, CA (US)

(72) Inventors: Suresh Subramani, San Jose, CA (US); Vincent Chung, Palo Alto, CA (US)

(73) Assignee: TIBCO Software Inc., Palo Alto, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/691,407

(22) Filed: Nov. 21, 2019

(65) Prior Publication Data

US 2020/0089707 A1 Mar. 19, 2020

Related U.S. Application Data

(63) Continuation of application No. 15/357,924, filed on Nov. 21, 2016, now Pat. No. 10,579,680.

(Continued)

(51) Int. Cl.
*G06F 16/901* (2019.01)
*G06F 16/22* (2019.01)
(Continued)

(52) U.S. Cl.
CPC ...... *G06F 16/9027* (2019.01); *G06F 16/2246* (2019.01); *G06F 16/51* (2019.01);
(Continued)

(58) Field of Classification Search
CPC ............. G06F 16/2246; G06F 16/9024; G06F 16/9027; G06F 16/51; G06F 16/22; G06F 16/20
(Continued)

(56) References Cited

U.S. PATENT DOCUMENTS 6,084,877 A * 7/2000 Egbert .................. H04L 45/745
370/389
6,757,742 B1 * 6/2004 Viswanath ........ H04L 29/12018
370/389

(Continued)

FOREIGN PATENT DOCUMENTS

JP H05081101 A 4/1993
JP H06314171 A 11/1994
(Continued)

OTHER PUBLICATIONS

BTree Wiki—https://en.wikipedia.org/wiki/B-tree, 1972.
(Continued)

*Primary Examiner* — Shahid A Alam
(74) *Attorney, Agent, or Firm* — McGuireWoods LLP

(57) ABSTRACT

Techniques to store graph information in a database are disclosed. In various embodiments, each node in a graph may be modeled as a micro b-tree. Node identity, attribute, edge, and edge attribute data may be stored in one or more pages modeled on page formats typically used to store index data for a relational database index. Data associated with a plurality of nodes and edges, each of said edges representing a relationship between two or more of said nodes, may be received. For each node, one or more pages of data may be created, each corresponding to a prescribed page size associated with a storage device in which said one or more pages are to be stored, and each page having a data structure that includes a variable-sized set of fixed length data slots and a variable-sized variable length data region.

20 Claims, 10 Drawing Sheets

Related U.S. Application Data

(60) Provisional application No. 62/336,473, filed on May 13, 2016.

(51) Int. Cl.
  *G06F 16/51* (2019.01)
  *G06F 16/20* (2019.01)

(52) U.S. Cl.
  CPC .......... *G06F 16/9024* (2019.01); *G06F 16/20* (2019.01); *G06F 16/22* (2019.01)

(58) Field of Classification Search
  USPC ........................................................ 707/797
  See application file for complete search history.

(56) References Cited

U.S. PATENT DOCUMENTS

| | | | |
|---|---|---|---|
| 7,653,938 B1 * | 1/2010 | Touitou ................. | H04L 63/123 726/14 |
| 7,668,845 B1 * | 2/2010 | Lomet ................. | G06F 16/2246 707/711 |
| 7,821,925 B2 * | 10/2010 | Davies .................... | H04L 47/10 370/229 |
| 8,180,763 B2 | 5/2012 | Freedman et al. | |
| 8,665,879 B2 * | 3/2014 | Matthews ............... | H04L 45/22 370/395.32 |
| 8,832,111 B2 * | 9/2014 | Venkataramani ... | H04L 67/2842 707/741 |
| 2006/0282455 A1 | 12/2006 | Lee et al. | |
| 2008/0181103 A1 * | 7/2008 | Davies .................... | H04L 47/10 370/230 |
| 2009/0037500 A1 | 2/2009 | Kirshenbaum | |
| 2011/0013639 A1 * | 1/2011 | Matthews ............... | H04L 45/00 370/395.32 |
| 2012/0089791 A1 | 4/2012 | Oberhofer et al. | |
| 2012/0317339 A1 | 12/2012 | Gissel et al. | |
| 2013/0173905 A1 * | 7/2013 | Inatomi ................. | H04L 9/0833 713/150 |
| 2013/0173908 A1 * | 7/2013 | Matthews ........... | H04L 45/7453 713/153 |
| 2013/0191416 A1 | 7/2013 | Lee et al. | |
| 2014/0009472 A1 | 1/2014 | Ajitomi et al. | |
| 2014/0280224 A1 * | 9/2014 | Feinberg ............. | G06F 16/9024 707/748 |
| 2014/0317087 A1 * | 10/2014 | Collins ............... | G06F 16/2455 707/715 |
| 2016/0055220 A1 | 2/2016 | Joshi et al. | |
| 2016/0299991 A1 * | 10/2016 | Hong .................. | G06F 16/2246 |
| 2017/0024488 A1 * | 1/2017 | Henderson ............. | G06F 16/25 |
| 2017/0091241 A1 | 3/2017 | Pashenkov et al. | |

FOREIGN PATENT DOCUMENTS

| | | |
|---|---|---|
| JP | 3070020 B2 | 7/2000 |
| JP | 2002-014776 A | 1/2002 |
| JP | 2004145766 A | 5/2004 |
| JP | 2008041108 A | 2/2008 |
| JP | 2014-010812 A | 1/2014 |
| WO | 2017096444 A1 | 11/2017 |

OTHER PUBLICATIONS

Korth et al. Database System Concepts, Second Edition: Ch 7—File and System Structure, Ch 8—Indexing and Hashing, Ch 13—Object-Oriented Model, Ch 14—Extended Relation Systems, Appendix A—Network Model, Appendix B—Hierarchical Model, (c) 1991.

McGoveran et al. A Guide to SYBASE and SOL Server, Chapter 15, pp. 303-317, 1992.

Nbtree.c—Implementation of Lehman and Yao's btree management algorithm for Postgres, Portions Copyright (c) 1996-2014, PostgreSQL Global Development Group, Portions Copyright (c) 1994, Regents oft.

Nvtinsert.c—Item insertion in Lehman and Yao btrees for Postgres Portions Copyright (c) 1996-2014, PostgreSQL Global Development Group, Portions Copyright (c) 1994, Regents of the University of California.

Nbtsearch.c—Search code for postres btrees, Portions Copyright (c) 1996-2014, PostgreSQL, Global Development Group, Portions Copyright (c) 1994, Regents of the University of California.

International Search Report and Written Opinion issued in related PCT/US2017/021451, dated May 25, 2017.

* cited by examiner

USING A B-TREE TO STORE GRAPH INFORMATION IN A DATABASE

CROSS REFERENCE TO OTHER APPLICATIONS

This application is a Continuation Application of pending U.S. patent application Ser. No. 15/357,924, filed Nov. 21, 2016, which claims priority to U.S. Provisional Patent Application No. 62/336,473, filed May 13, 2016, both applications entitled "USING A B-TREE TO STORE GRAPH INFORMATION IN A DATABASE" the disclosure of which is expressly incorporated by reference herein in its entirety.

BACKGROUND OF THE INVENTION

A graph is collection of vertices (sometimes referred to as "nodes") and edges. The nodes of a graph may represent any entity, and an edge may represent a relationship between the nodes connected by the edge. A graph database may be used to store a graph persistently, e.g., on a block storage medium (magnetic or solid state) that has random access capabilities. Each node may have many edges associated therewith. Each edge may have one or more attributes. Edges may be added, deleted, or changed (e.g., new or updated edge attributes), e.g., as relationships between entities represented by nodes of a graph change. Edges may be unidirectional (running from one node to another) or bidirectional (running from each node to the other).

Typically, graph databases have been represented in the form of one or more adjacency matrices. An adjacency matrix may be a square matrix used to represent a finite graph. The elements of the matrix indicate whether pairs of vertices are adjacent or not in the graph, i.e., whether there is an edge or other relationship between them.

A relational database stores data as one or more tables, each comprising rows and columns of data. Each row may be associated with an entity and the columns of that row may store data values for attributes of that entity. Rows are sometimes called "records" or "tuples". Generally, each table/relation represents one "entity type" (such as customer or product). The rows represent instances of that type of entity (such as "Lee" or "iPhone 6") and the columns representing values attributed to that instance (such as address or price).

A relational database and uses data set Join (Intersection and Union) theories to infer the relations between entities. Relationships are a logical connection between different tables. A relationship is established on the basis of interaction among these tables. Relationships of arbitrary complexity can be "inferred" using simple Set principles and retrieved using standard Query Language.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to store a graph database efficiently are disclosed. In various embodiments, each node of a graph is modeled as a micro B-tree. Node data is stored in one or more pages modeled on a page format used to store index data for a relational database, which typically is organized as a B-tree. Data associated with each node, including its node identifier and other node attributes, edges "owned" by that node, and associated edge attributes, is/are stored in an associated page.

In some embodiments, each node data page may be structured similarly to an "index page" of an index of a relational database. In various embodiments, in a node or root page as disclosed herein fixed length data values not exceeding a prescribed may be stored in "slots" of the associated page, while variable length values and/or variable length values greater than a prescribed size may be stored in a data value region of the page.

Figure 1:
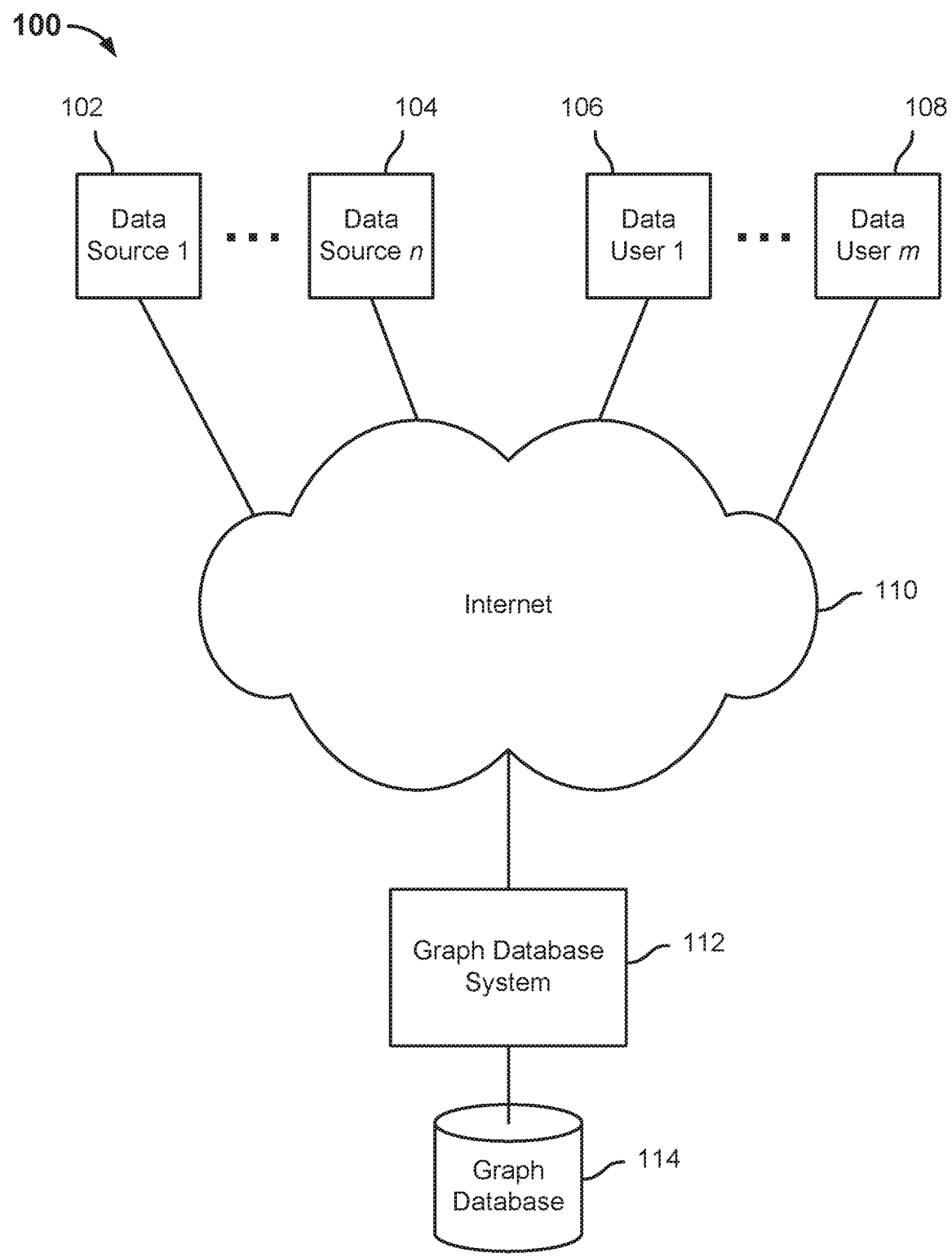
FIG. 1 is a block diagram illustrating an embodiment of a system and environment to store and access a graph database.

FIG. 1 is a block diagram illustrating an embodiment of a system and environment to store and access a graph database. In the example shown, computing environment 100 include a plurality of data sources 1 to n, represented in FIG. 1 by data sources 102 and 104, and a plurality of data users (consumers) 1 to m, represented in FIG. 1 by data users 106 and 108. Examples of data sources and data users include, without limitation, client computer systems, such as desktop, laptop, and other mobile computers; mobile devices, such as mobile phones, tablets, smart watches, Internet of Things devices, and other devices that generate or consume data; servers and cloud-based services, such as mobile apps and associated services, online shopping services, companies, banks, schools, and other enterprises and/or online services; etc. While separate data sources (102, 104) and data users (106, 108) are shown in FIG. 1, in various embodiments a single node/device may be both a data source and a data user.

In the example shown, data from data sources (102, 104) is communicated via the Internet 110 to a graph database system 112. Data entities (nodes), associated attributes, and relationships (edges) are captured and represented in data stored in a graph database 114. In FIG. 1, graph database 114 is shown to be external to graph database system 112, but in various embodiments graph database system 112 may include graph database 114. In various embodiments, graph database system 112 and graph database 114 may reside on a same physical and/or logical computer system, such as a same server or other computer.

In various embodiments, data generated by data sources (102, 104) may be aggregated and processed by graph database system 112. For example, users associated with data sources (102, 104) may engage in transactions, social network interactions, browsing, searches, web page downloads, sending and receiving of email and other messages, etc., using data sources (102, 104). At graph database system 112, data reflecting such uses may be received, collated, and stored in graph database 114. For example, users and other entities (e.g., transactions, events, companies, membership-based groups, products, topics, email messages, social network posts, etc.) may be represented as "nodes" in graph database 114, and relationships between such nodes may be determined at represented as "edges" between associated "nodes".

In various embodiments, techniques disclosed herein may be used to represent such node and edge data, and/or attributes of each, in an efficient manner. In particular, in various embodiments graph database 114 may be stored using a page format and content as disclosed herein, to enable pages of data to be read from and written to storage media efficiently.

In various embodiments, data users (106, 108) may access graph database 114, e.g., via requests sent to database system 112 via the Internet 110. Such requests may be serviced at least in part by reading one or more pages of data from a storage media (e.g., flash storage, hard disk drive, and/or other media) to locate and retrieve data responsive to the request. For example, a request to retrieve data concerning users who have "liked" or otherwise indicated an affinity to a page or other entity on social media may be services by accessing a stored page (i.e., a "page" in the sense of a page-based organization of underlying physical storage media, as opposed to a web page or social network page) associated with a graph database node corresponding to the aforementioned social media page, and edge (relationship) data comprising and/or linked to that page may be used to identify and retrieve records associated with users (nodes) who have a "liked by" relationship (edge) to the social media page. For example, attributes of such users may be aggregated and/or otherwise processed to respond to the request.

Figure 2:
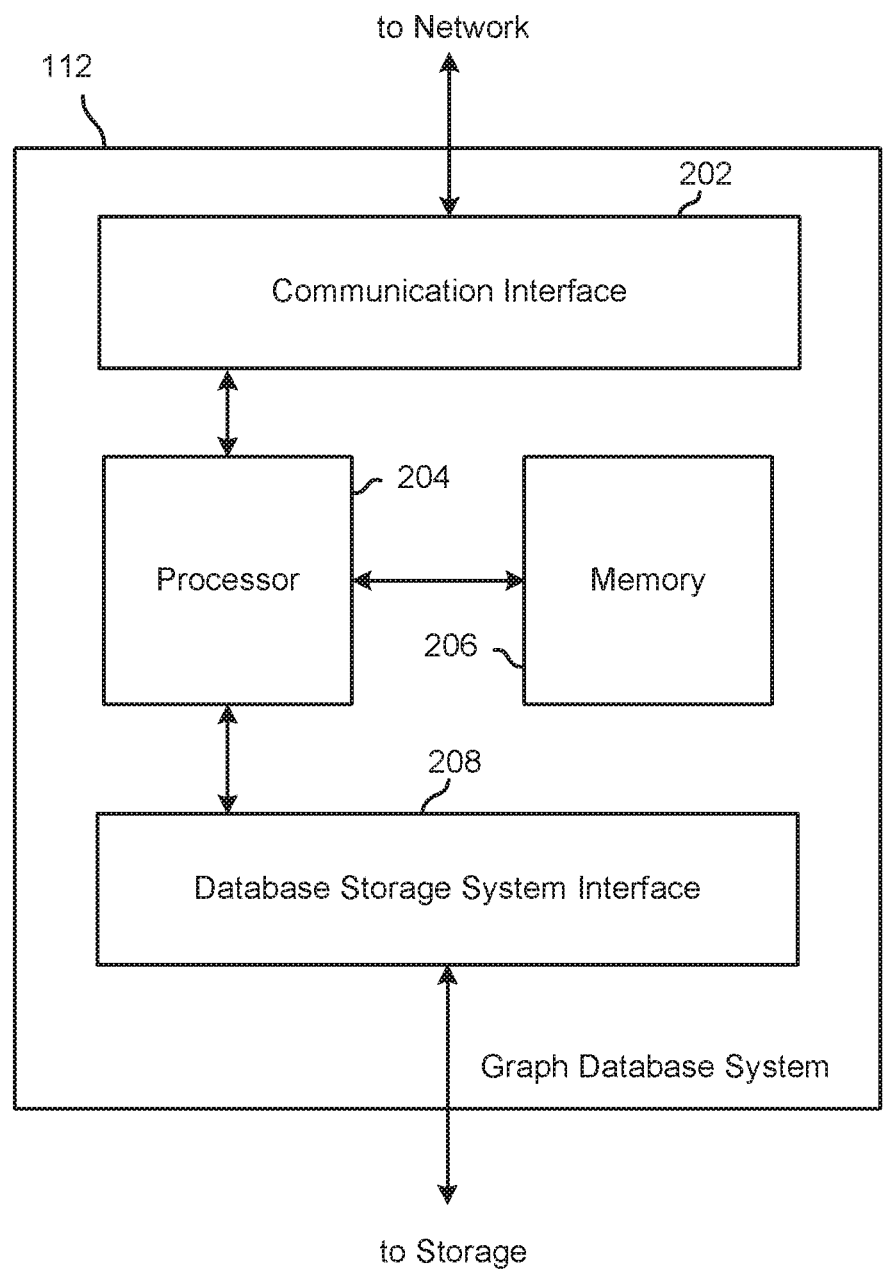
FIG. 2 is a block diagram illustrating an embodiment of a graph database system.

FIG. 2 is a block diagram illustrating an embodiment of a graph database system. In the example shown, graph database system 112 of FIG. 1 includes a communication interface 202 (e.g., a network interface card or other network communication interface) coupled to a processor 204. Processor 204 is coupled to a memory 206 in which computer instructions to be executed by processor 204 may be stored, along with data values on which processes running on processor 204 may operate. Processor 204 is coupled to a database storage system interface 208, which in various embodiments may be configured to access a local or external physical storage media (e.g., disk drive, flash drive, etc.) on which a graph database, such as graph database 114, may be stored. Data may be read from such media one or more data storage pages at a time. A physical or logical data storage device may be organized to be read from and written to in units corresponding to a "page", typically on the order of 512 bytes or 4 kilobytes in size, depending on the storage device and/or how the device is configured. Pages may be read by processor 204, using database storage system interface 208, and stored in memory 206 to be operated on. In some embodiments, an index (not shown) may be used to determine initially which data to retrieve, and data read from the graph database (e.g., relationships stored as edge data) may be used to identify further graph database records (e.g., stored pages associated with corresponding nodes of the graph represented by the graph database) to be retrieved.

Figure 3:
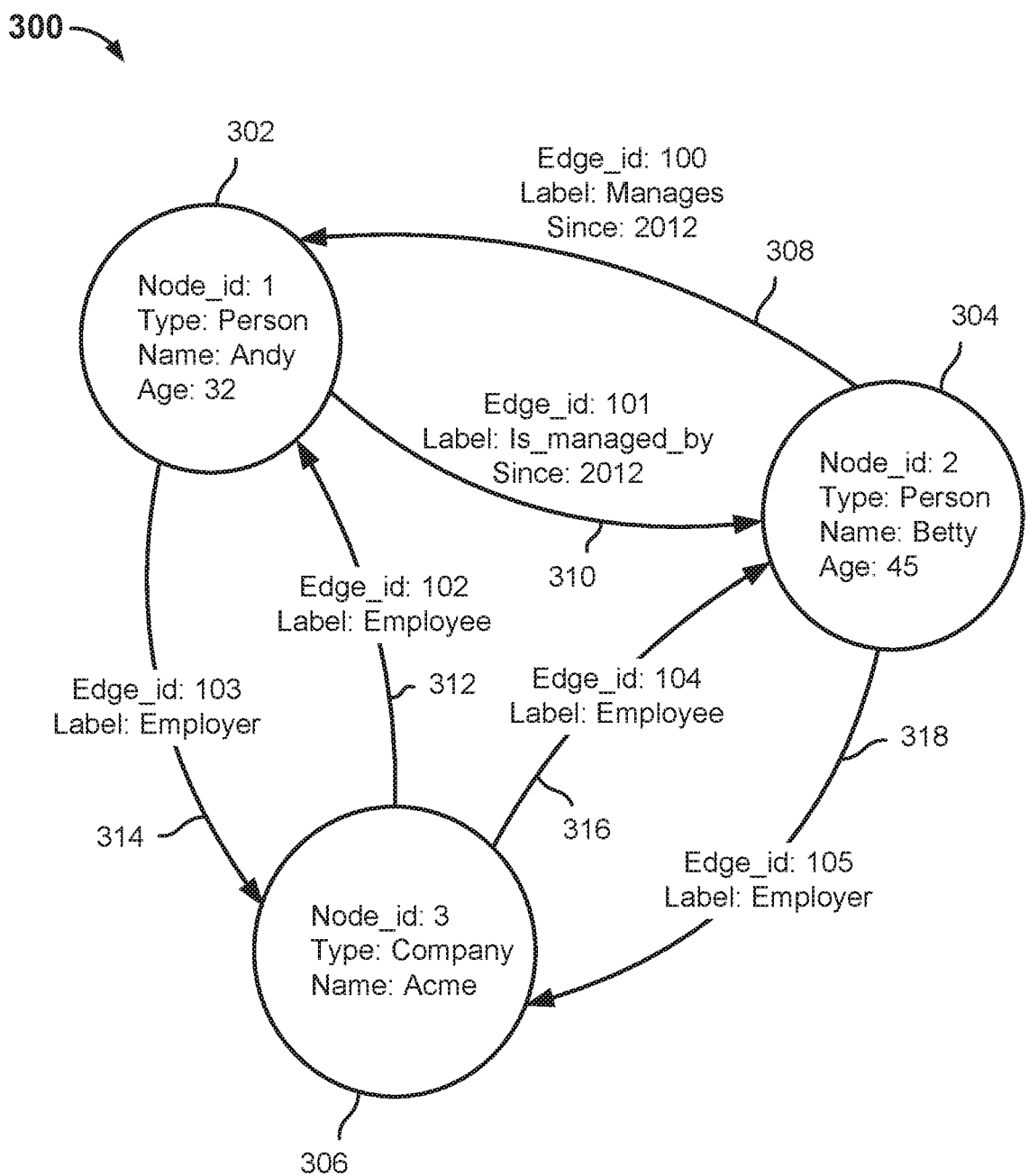
FIG. 3 is a diagram illustrating an example of a graph representation of a simplified set of data such as may be stored in an embodiment of a graph database system.

FIG. 3 is a diagram illustrating an example of a graph representation of a simplified set of data such as may be stored in an embodiment of a graph database system. In various embodiments, a graph such as the graph 300 shown in FIG. 3 may be represented and stored as disclosed herein, e.g., a graph database such as graph database 114 of FIG. 1. In the example shown, graph 300 includes three nodes (302, 304, 306), the first two nodes (302, 304) each representing an associated person and the third (306) representing a company. Edge 308 represents a relationship by which the person represented by node 304 manages the person represented by node 302, and edge 310 represented a corresponding relationship by which the person represented by node 302 is managed by the person represented by node 304. Edge 312 represents a relationship by which the person represented by node 302 is employed by the company represented by node 306, and edge 314 represented a corresponding relationship by which node 306 is identified as the employer of the person represented by node 302. Likewise, edge 316 represents a relationship by which the person represented by node 304 is employed by the company represented by node 306, and edge 318 represented a corresponding relationship by which node 306 is identified as the employer of the person represented by node 304.

The example shown in FIG. 3 is a highly simplified example, involving only two employees of a single company and a single relationship between them. In a typical use case, such as a social network graph or even a single enterprise and its employees, a graph may include many thousands of nodes and many thousands of relationships between them.

While in the example shown in FIG. 3 each relationship/edge has a corresponding relationship flowing back the other way, in some graphs an edge may be unidirectional, i.e., it may flow from one node to another but not back.

The potential power of a graph representation of a complex data set is evident from the highly simplified example shown in FIG. 3. For example, a query to determine the median age of employees of "Acme" Company, in the example shown, would be processed relatively very quickly by finding the node corresponding to that Company, using the "Employee" relationship (edge) data to quickly find all employees, retrieving the employees' respective age attributes from each employee's node in the graph, and using the retrieved age data to compute the median. By contrast, to respond to the same query using a relational database, the employer-employee relationship would need to be determined at runtime, using one or more "join" operations, just to find records that would have to be read to retrieve a complete set of age data to compute the median.

In various embodiments, techniques disclosed herein are used to represent and store on physical storage media data comprising a graph, such as graph 300 of FIG. 3, in a manner that enables edges and associated attributes and destination nodes of such edges to be determined and associated data to be accessed (e.g., created, read, updated, and/or deleted) efficiently.

Figure 4:
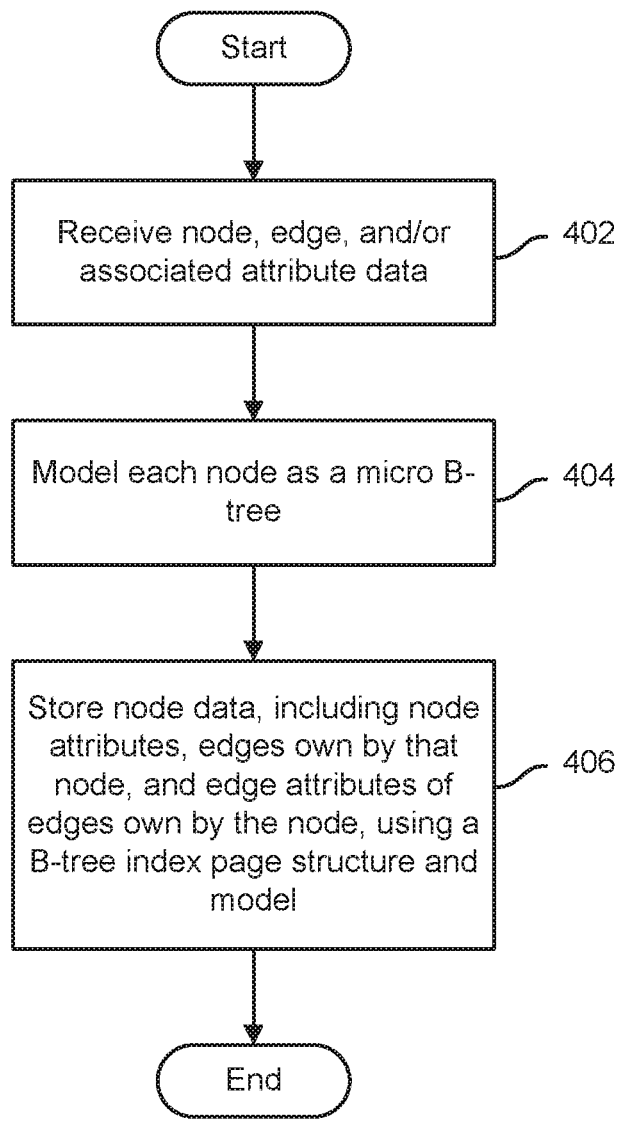
FIG. 4 is a flow chart illustrating an embodiment of a process to represent and store data in a graph database.

FIG. 4 is a flow chart illustrating an embodiment of a process to represent and store data in a graph database. In various embodiments, the process of FIG. 4 may be performed by a graph database system, such as graph database system 112 of FIG. 1, to provide a graph database, such as graph database 114 of FIG. 1. In the example shown, node, edge, and/or associated attribute data (i.e., node attributes and/or edge attributes) are received (402). For example, data associated with newly-created nodes and/or edges, and/or updates to attributes of such nodes and/or edges, may be received. Each node is modeled as a micro B-tree (404).

In various embodiments, modeling each node as a micro B-tree includes representing and storing node data (e.g., one or more of node identifier, node attributes, edges owned by the node, and attributes of such edges) in a page formatted and/or modeled in a same manner as index pages typically used to store index data for a relational database index. An example of such a page used in some embodiments is shown in FIG. 5, described below.

Referring further to FIG. 4, the received node data (e.g., one or more of node identifier, node attributes, edges owned by the node, and attributes of such edges) is stored using a B-tree index type page (406). For example, a page constructed in memory may be written to physical and/or logical storage in a single page write operation.

Figure 5:
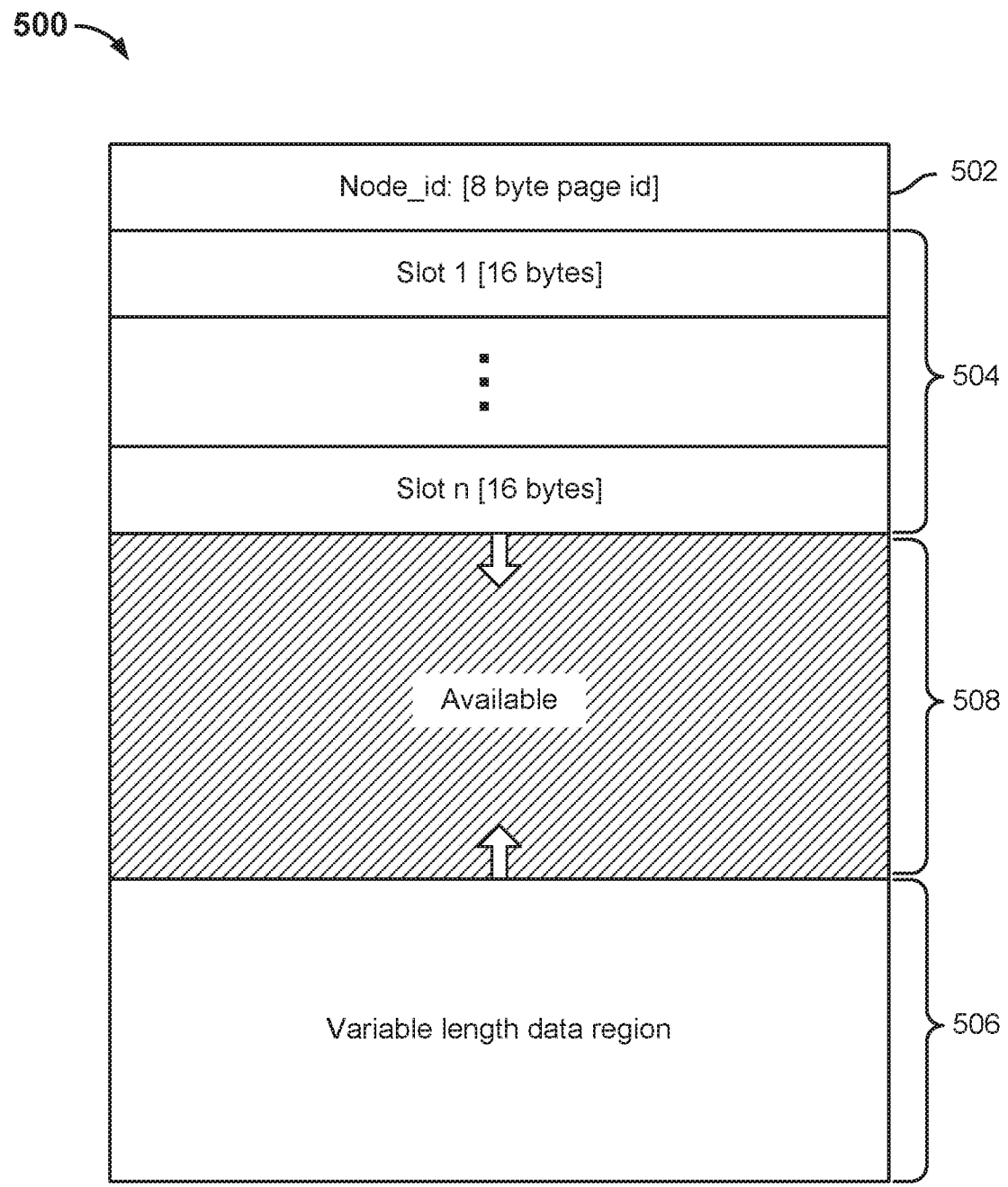
FIG. 5 is a diagram illustrating an example of a node data page structure used in an embodiment of a graph database system.
Figure 6:
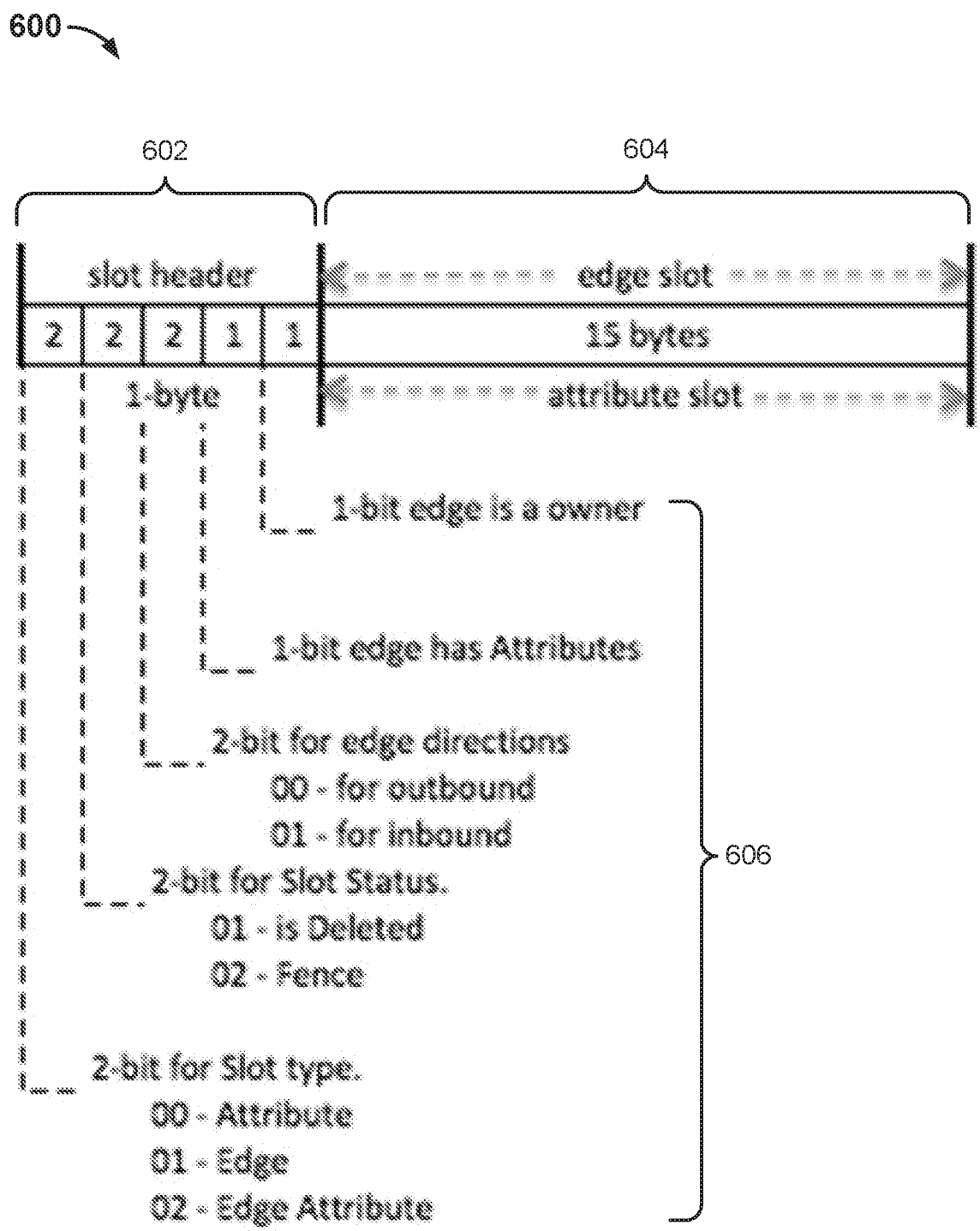
FIG. 6 is a diagram illustrating an example of a slot data structure used in an embodiment of a graph database system.
Figure 7A:
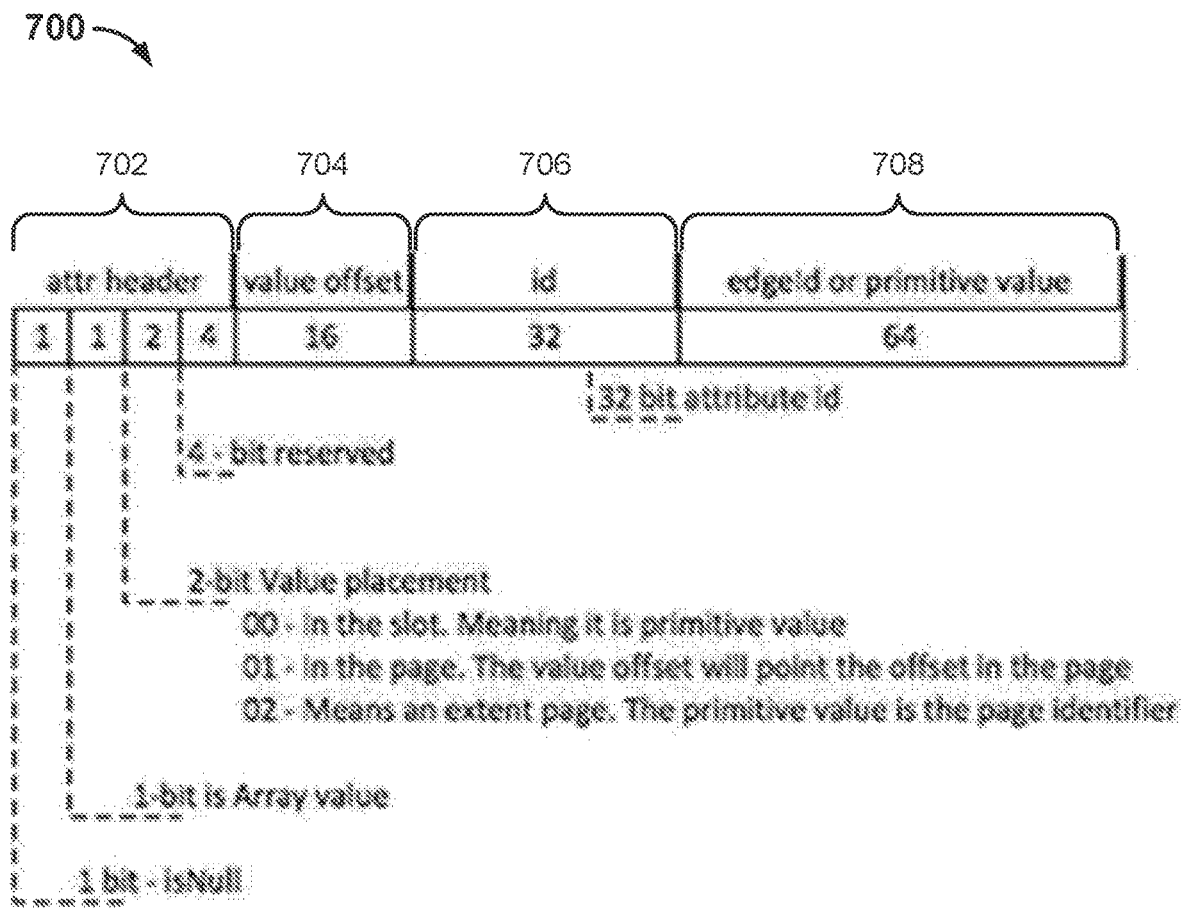
FIG. 7A is a diagram illustrating an example of a format and structure of a non-header portion of a slot data structure used to store node or edge attribute data in an embodiment of a graph database system.
Figure 7B:
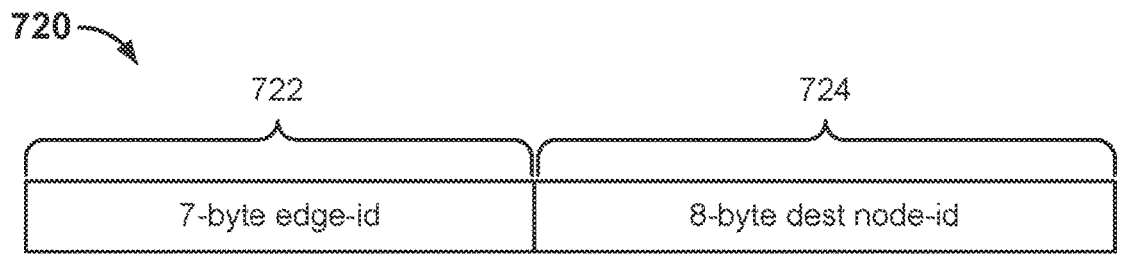
FIG. 7B is a diagram illustrating an example of a format and structure of a non-header portion of a slot data structure edge data in an embodiment of a graph database system.

FIG. 5 is a diagram illustrating an example of a node data page structure used in an embodiment of a graph database system. In various embodiments, the page 500 shown in FIG. 5 may be used to represent and store node data, e.g., as in step 406 of FIG. 4. In the example shown, the page 500 includes a node identifier region 502 in which a node identifier that uniquely identifies a node with which the page is associated is stored. In the example shown, the node identifier is the same as an 8 byte (or other) page identifier of the page 500. The page 500 further includes a variable number of fixed width "slots" 504. Slots may be formatted as shown in FIGS. 6, 7A, and 7B, and may be used to store node data, edge data, and/or associated attributes. For example, values of a size that fits in a single slot may be stored in slots 504. In various embodiments, data structures as shown in FIGS. 6, 7A, and 7B may be stored in slots 504. Page 500 also includes a variable length data region 506 in which data that does not fit in a single one of slots 504 may be stored. For example, arbitrarily long attribute data may be stored in variable length data region 506. An identification of and/or pointer to such data (e.g., an offset within variable length data region 506) may be written into a corresponding one of slots 504. In various embodiments, formatted and/or fixed (or relatively shorter) length data may be written to slots 504, adding slots as necessary, and variable length data may be added to variable length data region 506, so long as unused space 508 remains available in the page 500. Once/if the page 500 becomes (or approaches within a prescribed threshold of becoming) full, the page 500 may be split, as described more fully below.

FIG. 6 is a diagram illustrating an example of a slot data structure used in an embodiment of a graph database system. In various embodiments, the data structure 600 of FIG. 6 may be used to store graph data (nodes, edges, attributes) in fixed width slots, such as slots 504 of FIG. 5. In the example shown, slot data structure 600 includes for each 16 byte wide slot a 1 byte wide slot header 602 and a 15 byte wide slot data value section 604. In the example shown, the slot header store data as indicated by key 606. In other embodiments, the specific format and content of data in the slot header 602 may be different in its particulars than as shown in FIG. 6. In the example shown, each slot header 602 includes a 2-bit value to indicate a slot type, i.e., 00 to indicate that a node attribute is stored in/by the slot, 01 to indicate an edge is stored in/by the slot, and 02 to indicate that an edge attribute is stored. The next 2 bits in this example indicate a slot status (00—is Active; 01—is Deleted; 02—Fence, to indicate a slot is the last slot value on that page), followed by 2 bits to indicate edge direction (if the slot store an edge; 00—outbound, 01—inbound), followed by 1 bit to indicate whether the edge (if an edge slot) has attributes, and a final bit to indicate that the edge is one the node owns. The 15 byte wide slot data value section 604 stores either edge slot data values or (edge/node) attribute slot data values, formatted in some embodiments as indicated in FIGS. 7A (attribute) and 7B (edge), depending on the slot type indicated in the first two bits of the slot header 602.

FIG. 7A is a diagram illustrating an example of a format and structure of a non-header portion of a slot data structure used to store node or edge attribute data in an embodiment of a graph database system. In some embodiments, the data structure 700 of FIG. 7A is used to populate the non-header (i.e., slot data value) section 604 of a slot as indicated in FIG. 6, in the case of a node attribute or edge attribute type slot (i.e., slot type 00 or 02 in the example shown in FIG. 6). In the example shown in FIG. 7A, the data structure 700 includes a 1 byte wide attribute header section 702 configured to store data according to the scheme shown in FIG. 7A. For example, the first bit may be used to indicate a null value for the attribute; the second bit may be used to indicate the attribute is an array value; the next two bits may be used to indicate where the attribute value is stored (00—in the slot itself, e.g., as a primitive value; 01—in the variable length region of the page, in which case an offset is stored in the slot; or 02—indicating an extent page, in which case a corresponding page identifier of a page in which the corresponding data resides is stored in the slot as a primitive value). The next two bytes of the slot data value section data structure 700 are designated to be used to store an offset within the page of a corresponding attribute value, as applicable (e.g., in the case the value is not stored in the slot itself). A 4 byte wide attribute identifier section 706 stores a 32 bit attribute id. Finally, an 8 byte wide payload section 708 stores either an edge id, to indicate the edge with which the attribute is associated in the case of an edge (as opposed to a node) attribute or a primitive value in the case of a node attribute the value of which fits in the 8 byte wide payload section 708.

While a particular data structure, scheme, and key are shown in FIG. 7A, in other embodiments other formats may be used to represent attribute data in a node attribute and/or edge attribute type slot.

FIG. 7B is a diagram illustrating an example of a format and structure of a non-header portion of a slot data structure edge data in an embodiment of a graph database system. In some embodiments, the data structure 720 of FIG. 7B is used to populate the non-header (i.e., slot data value) section 604 of a slot as indicated in FIG. 6, in the case of an edge type slot (i.e., slot type 0 in the example shown in FIG. 6). In the example shown in FIG. 7B, the data structure 720 includes a 7 byte wide edge identifier section 722 in which an edge identifier value is stored; and an 8 byte wide destination node identifier section 724 in which a node identifier of a destination node associated with the edge is stored. In various embodiments, it is not necessary to store the edge origin/owner, since that relationship is implied by the fact that the edge slot is included in a page associated with the node that is the origin of and therefore (in various embodiments) is considered to own the edge.

Figure 8:
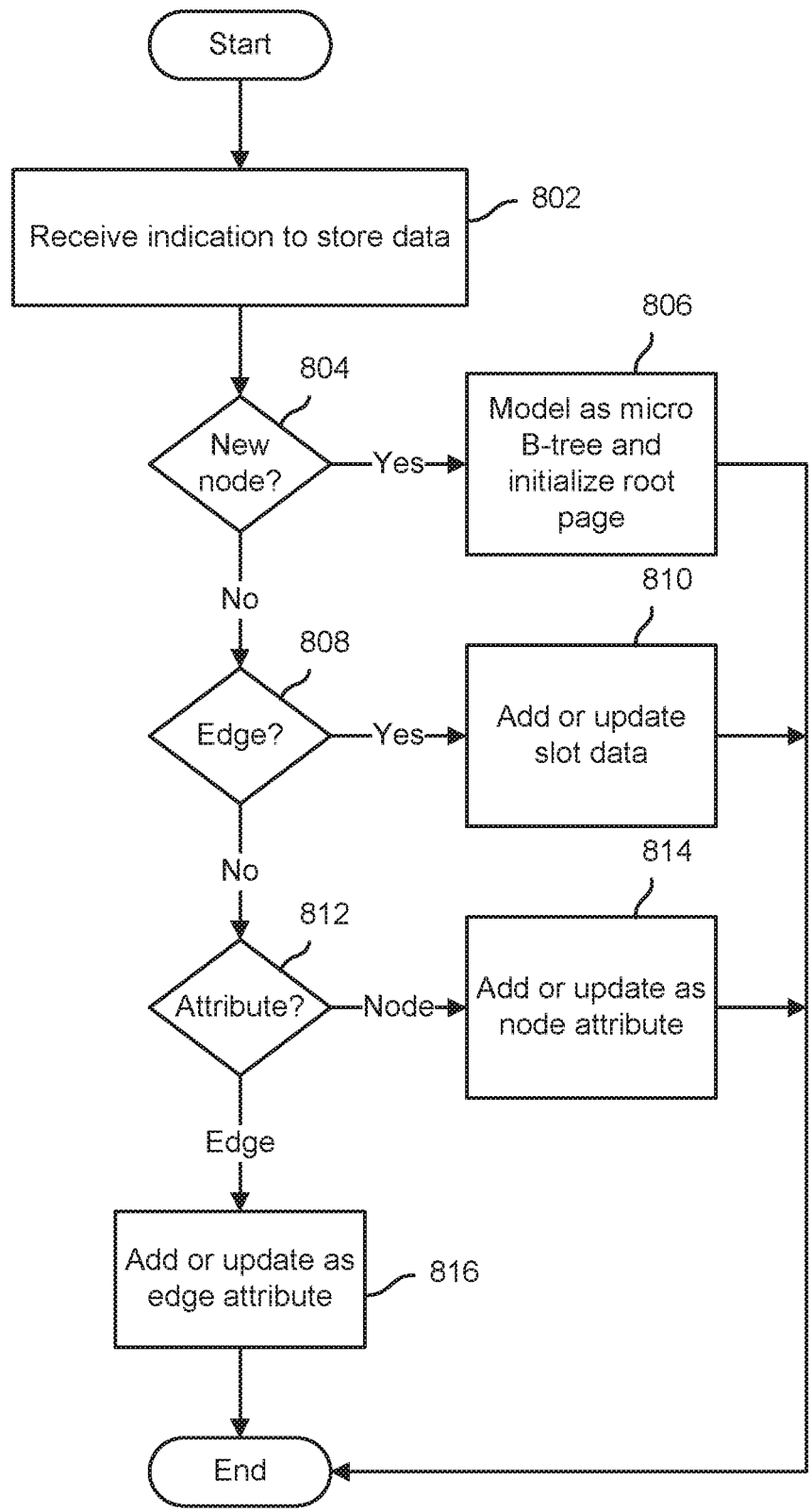
FIG. 8 is a flow chart illustrating an embodiment of a process to store data in a graph database.

FIG. 8 is a flow chart illustrating an embodiment of a process to store data in a graph database. In various embodiments, the process of FIG. 8 may be performed by a graph database system, such as graph database system 112 of FIG. 1. In the example shown, an indication is received to store data (802). If the data is associated with a new node in an associated graph (804), e.g., an entity that has not be seen or represented previously in an associated graph database, then the new node is modeled as a micro B-tree as disclosed herein and a root page to represent the node in the graph database is initialized (806) and used to store the received data. If the received data is associated with an existing node (804) and is associated with an edge owned by the existing node (e.g., adds, modifies, or deletes an edge), then corresponding edge slot data is added or modified in a page associated with the existing node that owns the edge (810). If the data is not related to a new node (804) and is not a new or modified edge (808), then the new data is processed as an update to either node or edge attribute data (812) of the existing node, either by adding or modifying node attribute data in a node attribute slot and/or in data regions and/or pages indicated by such a slot (814) or by adding or modifying edge attribute data in an edge attribute slot and/or in data regions and/or pages indicated by such a slot (816), as applicable.

Figure 9:
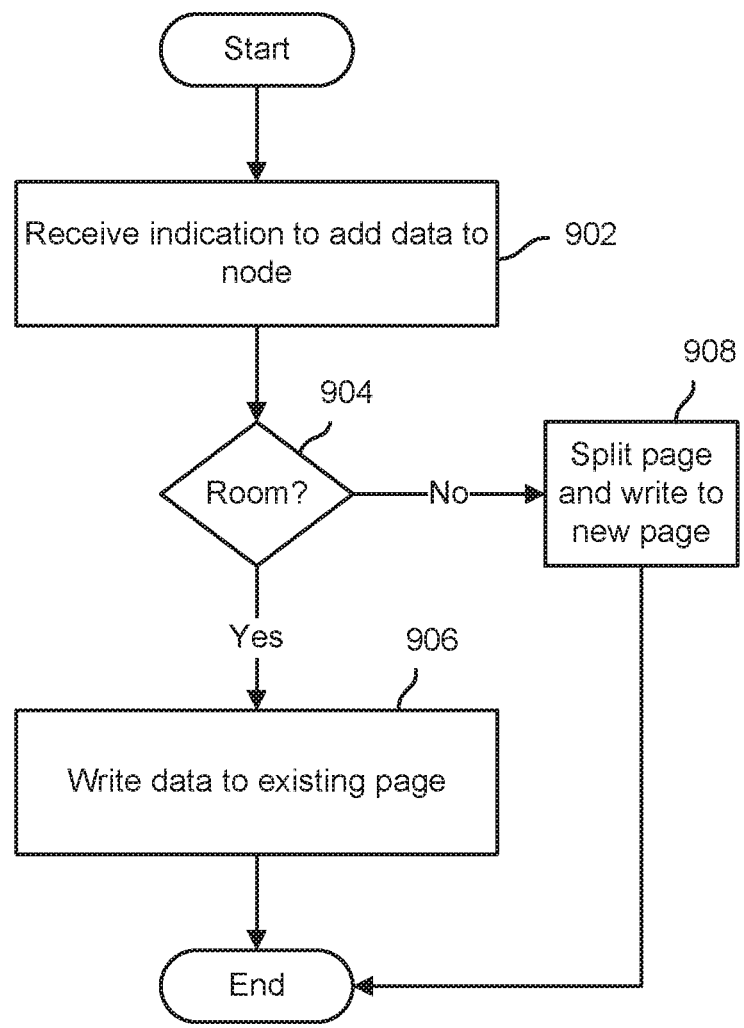
FIG. 9 is a flow chart illustrating an embodiment of a process to store data in a graph database.

FIG. 9 is a flow chart illustrating an embodiment of a process to store data in a graph database. In various embodiments, the process of FIG. 9 may be performed by a graph database system, such as graph database system 112 of FIG. 1. In the example shown, an indication is received to store additional data associated with a node (902). For example, an additional attribute, an additional or different value of an attribute, additional edges and/or edge attributes, etc. may be received. If there is room in any existing page associated with the node (904), the data is written to the existing page (906). For example, a determination may be made as to whether an available portion of a page associated with the node, such as its root page or an additional page associated with the node, corresponding for example to the available space 508 of FIG. 5, is of sufficient size to store the new data. If the space available on the existing page(s) associated with the node is not sufficient (904), a page split operation is performed to split the data associated with the node over two (or more) pages (908), and the new data is written to available space in one of the resulting pages.

In various embodiments, b-tree and/or related techniques may be used to split pages in a manner that maintains balance within a micro b-tree model of a given node. For example, pages may be split in a manner that balances an amount of data stored in the respective pages into which a page is being split.

Figure 10:
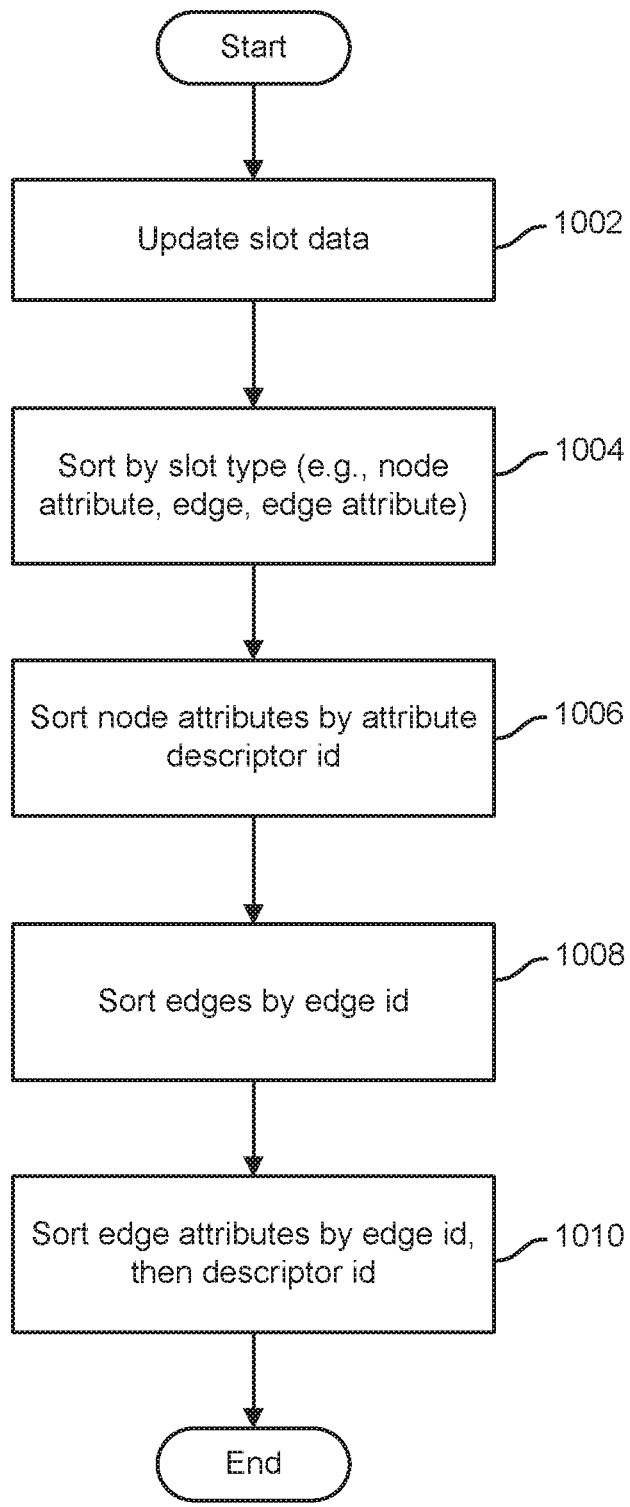
FIG. 10 is a flow chart illustrating an embodiment of a process to sort data stored in a graph database.

FIG. 10 is a flow chart illustrating an embodiment of a process to sort data stored in a graph database. In various embodiments, the process of FIG. 10 may be performed by a graph database system, such as graph database system 112 of FIG. 1. In various embodiments, the process of FIG. 10 may be implemented to store graph data in a sorted order that facilitates retrieval of data, such as by quickly traversing a graph to find data of interest. In the example shown, when node (page) slot data is updated (1002), the prior to writing the page to storage the slots are sorted by slot type (e.g., node attribute slots first, then edge slots, followed last by edge attribute slots) (1004). Within the node attribute slots, the slots are sorted by attribute descriptor identifier (1006). Edges are sorted by edge id (1008) and edge attributes are sorted by edge id, then attribute descriptor id (1010).

Techniques disclosed herein to represent and store graph data in various embodiments may enable the advantages of representing a at least certain sets of data as a graph and storing associated data in a graph database to be realized within minimal input/output operations and other efficiencies. In various embodiments, graph databases comprising a large number of edges (e.g., relationships), such as may be characteristic of social network and similar data sets, may be stored and accessed efficiently using techniques disclosed herein.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
a storage device organized as a plurality of pages of a prescribed page size; and
a processor configured to:
create at least one of each node of a plurality of nodes and at least one edge of one or more pages of data, each corresponding to said prescribed page size, and each page having a b-tree index data structure that includes a first section having a variable-sized set of fixed width data slots and a second section having a variable-sized variable length data region;
receive an indication to store data and determine to process the data as an update to either node attribute data or edge attribute data when the data is associated with the at least one of each node of the plurality of nodes and the at least one edge of the one or more pages of data;
perform at least one of a read, update, and delete transaction operation on the plurality of nodes and edges; and
determine traversal of relationships between nodes and edges, comprising;

determine an edge of the edges that is associated with a first node and a second node of the nodes, wherein the edge that is associated with the two nodes represents a relationship by which the first node controls the second node of the two nodes; and determine a relationship by which the first node controls the second node based on the edge associated with the two nodes.

2. The system of claim 1, wherein fixed length data slots are used to store one or more of node attribute data, edge data, and edge attribute data associated with the node.

3. The system of claim 1, wherein data values too large to be stored in said fixed length data slots is stored.

4. The system of claim 1, wherein each of said edges representing a relationship between two or more of said nodes, wherein each data slot includes a slot header and a slot data region; wherein the slot header includes values to indicate slot type, slot status, and edge direction; wherein the slot data region stores one of edge slot data values and attribute slot data values.

5. The system of claim 4, wherein the slot header includes a field to store an offset indicating a location in which a corresponding value is located within said variable length data region.

6. The system of claim 1, wherein the slot header includes one or more fields to store the slot type.

7. The system of claim 6, wherein the slot type indicates a type of data stored in or stored in a location identified by data stored in a corresponding slot data value section of that slot.

8. The system of claim 7, wherein the slot data value section stores a primitive value of a size equal to or smaller than a fixed width of said slot data value section.

9. The system of claim 1, wherein said processor is configured to add slots to said page and increase a size of said variable length data region as needed to store additional data associated with a given node until there is no further available space in said page of said prescribed page size.

10. The system of claim 9, wherein the processor is configured to split the page if additional data is to be stored for a node and would result in a page that exceeds said prescribed page size.

11. The system of claim 1, wherein the processor is further configured to sort said data slots prior to writing said page to the storage device.

12. The system of claim 11, wherein the processor is configured to sort the slots based at least in part on a respective slot type of each slot.

13. The system of claim 11, wherein the processor is configured to sort the slots in a manner that results in node attributes being included first in sorted order, followed by edges owned by the node, followed by edge attributes.

14. A method, comprising:
creating at least one of each node of a plurality of nodes and at least one edge of one or more pages of data, each corresponding to a prescribed page size associated with a storage device in which said one or more pages are to be stored, and each page having a b-tree index data structure that includes a first section having a variable-sized set of fixed width data slots and a second section having a variable-sized variable length data region;

receiving an indication to store data and determining to process the data as an update to either node attribute data or edge attribute data when the data is associated with the at least one of each node of the plurality of nodes and the at least one edge of the one or more pages of data;

performing at least one of a read, update, and delete transaction operation on the plurality of nodes and edges; and determining traversal of relationships between nodes and edges, wherein determining the traversal of the relationships between the nodes and the edges comprises:
determining an edge of the edges that is associated with a first node and a second node of the nodes, wherein the edge that is associated with the two nodes represents a relationship by which the first node controls the second node of the two nodes; and
determining a relationship by which the first node controls the second node based on the edge associated with the two nodes.

15. The method of claim 14, wherein fixed length data slots are used to store one or more of node attribute data, edge data, and edge attribute data associated with the node.

16. The method of claim 14, wherein data values too large to be stored in said fixed length data slots is stored.

17. The method of claim 14, wherein each of said edges representing a relationship between two or more of said nodes, wherein each data slot includes a slot header and a slot data region; wherein the slot header includes values to indicate slot type, slot status, and edge direction;
wherein the slot data region stores one of edge slot data values and attribute slot data values.

18. The method of claim 14, wherein the slot header includes one or more fields to store the slot type.

19. The method of claim 18, wherein the slot type indicates a type of data stored in or stored in a location identified by data stored in a corresponding slot data value section of that slot.

20. A computer program product embodied in a non-transitory computer readable medium and comprising computer instructions for:
creating for at least one of each node of a plurality of nodes and at least one edge of one or more pages of data, each corresponding to a prescribed page size associated with a storage device in which said one or more pages are to be stored, and each page having a b-tree index data structure that includes a first section having a variable-sized set of fixed width data slots and a second section having a variable-sized variable length data region;

receiving an indication to store data and determining to process the data as an update to either node attribute data or edge attribute data when the data is associated with the at least one of each node of the plurality of nodes and the at least one edge of the one or more pages of data;

performing at least one of a read, update, and delete transaction operation on the plurality of nodes and edges; and determining traversal of relationships between nodes and edges, wherein determining the traversal of the relationships between the nodes and the edges comprises:
determining an edge of the edges that is associated with a first node and a second node of the nodes, wherein the edge that is associated with the two nodes represents a relationship by which the first node controls the second node of the two nodes; and
determining a relationship by which the first node controls the second node based on the edge associated with the two nodes.

* * * * *